Feb. 3, 1948.  L. E. RABJOHN  2,435,510
FILTER CARTRIDGE
Filed Aug. 26, 1946
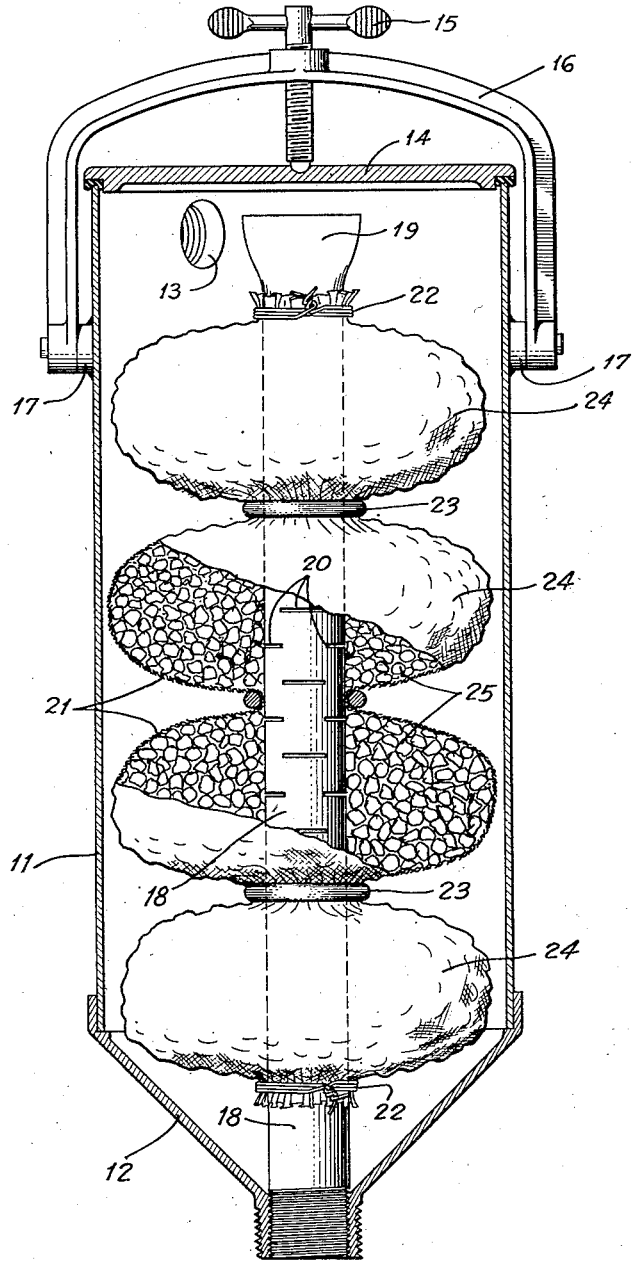
Inventor:
LLOYD E. RABJOHN,
By
John H. Rouse,
Attorney.

Patented Feb. 3, 1948

2,435,510

UNITED STATES PATENT OFFICE 2,435,510

FILTER CARTRIDGE

Lloyd E. Rabjohn, Glendale, Calif.

Application August 26, 1946, Serial No. 692,951

1 Claim. (Cl. 210—131)

My present invention relates to filter cartridges and more particularly to one for purifying ordinary hydrant water for drinking purposes.

It is an object of this invention to provide a readily removable and replaceable filter cartridge of the type described which serves not only to remove from the water matter suspended therein, but also to adsorb distasteful gases such as the chlorine usually added for sterilization.

Another object is to provide a filter cartridge, of the character described in the preceding object, which is very simple and economical to manufacture; a feature of the invention residing in the method of assembling the component parts of the cartridge.

For full understanding of the invention, and further appreciation of its features and advantages, reference is to be had to the following detailed description and accompanying drawing, and to the appended claim.

The single figure of the drawing is a longitudinal sectional view of a filter cartridge embodying the invention, and a container therefor.

The filter cartridge, to be described, is shown in the drawing mounted in a cylindrical container comprising a shell or body 11 to the lower end of which is secured a funnel-shaped extension 12 externally threaded at its small end for connection to a water-supply pipe; the outlet of the container being indicated at 13 adjacent the top of shell 11. The top of the shell is closed by a plate 14 which is clamped in position by a hand-screw 15 threaded in a bail 16 swingably mounted at its ends on supports 17 welded to the shell; the arrangement being such that when the cover plate is removed the bail can be swung to a position in which it does not obstruct the mouth of the shell.

The filter cartridge is constituted by a tube 18 and the parts supported thereon. This tube is threaded at its lower end to cooperate with threads in the small end of the container; the upper end of the tube being pinched, as indicated at 19, to close it and also to permit engagement of a wrench or pliers when removing or replacing the cartridge. Slots 20 are cut through the side wall of the tube along a major portion of its length. Around the apertured body of the tube is a sleeve 21, of fine-mesh fabric such as "nylon," which is fastened at its opposite ends to the tube by wire bindings 22 and at intermediate points by rings 23 so as to form a plurality of separate pouches or receptacles 24 which are filled with relatively-coarse granules 25 of activated carbon or other material capable of adsorbing a large volume of gas.

In assembling the filter unit, the sleeve 21, which is considerably larger than the tube and preferably of seamless construction, is first wired at one end to the tube. A measure-full of carbon granules is poured into the space between the tube and the sleeve, and one of the rings 23 slipped over the sleeve and drawn down to position; other measures-full of granules then being introduced and confined in a similar manner. The rings 23 are preferably of semi-elastic plastic material so that they grip the sleeve firmly.

Water emerging from the slots 20 contacts the carbon granules which, by adsorption, remove objectionable gases which may be present; any fine solids suspended in the water being removed in its passage through the filter fabric. The carbon granules are so coarse that they do not serve as a filtering medium except in regard to very large particles of dirt, and due to their coarseness they do not appreciably impede passage of the water. The carbon granules serve to keep the filter fabric extended so that substantially all of its surface is active. By dividing the filter into sections, the surface area of the degassing and filter material is increased for a given size of cartridge.

The embodiment of my invention herein shown and described is susceptible of modification without departing from the spirit of the invention, and I intend therefore to be limited only by the scope of the appended claim.

I claim as my invention:

A cartridge for filtering and degassing water, comprising: a tube threaded at one end for cooperation with a water-supply connection, the other end of the tube being pinched to close it and to permit engagement of a wrench, there being a plurality of apertures through the side wall of the tube and spaced along the length thereof; a sleeve of fine-mesh fabric around said tube and closingly joined at its opposite ends to the tube adjacent the ends of the same, said sleeve being considerably larger than the tube; means for dividing said sleeve so that it forms a plurality of receptacles each communicating with ones of said apertures, said dividing means comprising a plurality of rings spaced apart between the closed ends of the sleeve and gripping the sleeve to the tube; and relatively-coarse granules of activated carbon filling each of said receptacles.

LLOYD E. RABJOHN.

REFERENCES CITED

The following references are of record in the file of this patent:

UNITED STATES PATENTS

| Number | Name | Date |
|---|---|---|
| 2,057,237 | Hoop | Oct. 13, 1936 |
| 2,063,086 | Fitz Gerald | Dec. 8, 1936 |
| 2,278,488 | Ralston | Apr. 7, 1942 |
| 2,320,990 | White | June 8, 1943 |

FOREIGN PATENTS

| Number | Country | Date |
|---|---|---|
| 15,354 | Great Britain | 1896 |